United States Patent [19]

Kowalski et al.

[11] 4,269,340
[45] May 26, 1981

[54] LOAD BEARING CROSS-SLAT

[75] Inventors: Ben C. Kowalski, Troy; Daniel J. Kowalski, Ortonville; Douglas J. Ferguson, Davisburg, all of Mich.

[73] Assignee: Four Star Corporation, Troy, Mich.

[21] Appl. No.: 79,943

[22] Filed: Sep. 28, 1979

[51] Int. Cl.³ ............................................. B60R 7/00
[52] U.S. Cl. .................................. 224/326; 224/321; 224/325
[58] Field of Search ............... 224/321, 309, 319, 321, 224/322, 324, 325, 326, 327

[56] References Cited

U.S. PATENT DOCUMENTS

| Re. 26,539 | 3/1969 | Bott | 224/321 |
|---|---|---|---|
| 2,645,391 | 7/1953 | Deschamps | 224/325 |
| 3,253,755 | 5/1966 | Bott | 224/321 |
| 3,325,067 | 6/1967 | Helm | 224/321 |
| 3,325,068 | 6/1967 | Helm | 224/325 |
| 4,015,760 | 4/1977 | Bott | 224/324 |
| 4,132,335 | 9/1977 | Ingram | 224/324 |
| 4,174,794 | 11/1979 | Bott | 224/325 X |

*Primary Examiner*—Steven M. Pollard
*Attorney, Agent, or Firm*—Reising, Ethington, Barnard, Perry & Brooks

[57] ABSTRACT

A load bearing cross-slat for association with an article carrier, such as a luggage carrier, is adapted to extend transversely across a vehicle roof between a pair of carrier tracks. The cross-slat is anchored to the tracks at its ends and is cambered upward toward the center of the vehicle. The camber of the slat spaces the slat above the vehicle roof, and allows the weight of an article placed thereon to be supported at the ends of the slat and, thus, by the tracks.

4 Claims, 2 Drawing Figures

LOAD BEARING CROSS-SLAT

BACKGROUND OF THE INVENTION

I. Field of the Invention

The present invention pertains to a load bearing slat for article carriers. More particulary the present invention pertains to a transverse load bearing slat for vehicle-related article carriers. Even more particularly, the present invention concerns a load bearing cross-slat fastened to the vehicle at the ends thereof for vehicle-associated luggage racks, ski-racks, or other article carriers.

II. Prior Art

In U.S. patent application No. RE 26,539 and U.S. Pat. No. 3,325,068 there is disclosed vehicle associated article carriers with load supported cross-slats. U.S. Pat. No. RE 26,539 incorporates load supporting or bearing cross-slats spaced above and supported by the roof panel along their length using rubber pads. U.S. Pat. No. 3,325,068 discloses a cross-slat supported at its ends by a carrier frame and supported along its length by a rubber member introduced between the slat and the roof panel. In copending U.S. Pat. No. 079,596 filed Sept. 28, 1979 entitled "Load Bearing Adjustable Bed Area Slat" the disclosure of which is hereby incorporated by reference, is disclosed a cambered load bearing slat supported by a movable bracket. None of the known prior art, however, discloses a cambered slat spaced above the vehicle roof, and which is supported at its ends by the roof panel.

STATEMENT OF RELEVANT ART

To the best of Applicant's knowledge the above listed United States patents as well as the copending application are believed to be the prior art most closely related to the present invention, copies of the patents being provided herein.

SUMMARY OF THE INVENTION

In accordance with the present invention, there is provided a load bearing cross-slat for an article carrier, wherein the slat extends transversely between a pair of carrier tracks and is cambered to be spaced above a vehicle roof.

The load bearing slat hereof, generally comprises:
(a) a member extending transversely between a pair of tracks provided in an article carrier, the member or slat being cambered to be spaced above the vehicle roof at the center thereof; and
(b) means for anchoring or attaching the slat to the vehicle roof.

The slat may, also, include a load supporting rub-strip along an upper surface of the slat.

A load placed on the slat is supported at the ends of the slat, the camber producing a downward and outward force vector at the slat ends. In a preferred embodiment of the present invention the load bearing cross-slat is gently or slightly cambered and spaced above the vehicle roof and anchored to the roof at the carrier track.

Each carrier track hereof, optionally, includes a means for receiving a variable, adjustably positionable bracket. The track is attached to the vehicle roof with a resilient pad between the track and roof. The track is designed to be contiguous with the vehicle body when attached thereto. The track bracket receiving means comprises a longitudinal channel formed along a surface of the track.

Where used, the bracket includes a positioning means which comprises a slide plate or base adapted to be slidingly disposed in the channel formed in the track.

A locking means is provided to releasably lock the bracket along the track.

For a more complete understanding of the present invention reference is made to the following detailed description and accompanying drawings. In the drawings, like reference characters refer to like parts through the several views, in which:

DESCRIPTION OF THE PREFERRED EMBODIMENT

Figure 1:
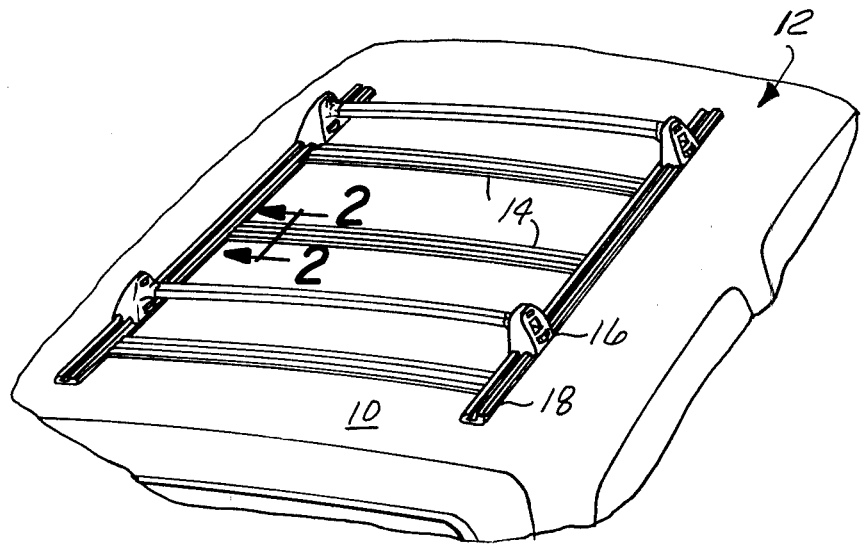
FIG. 1 is a perspective view of a vehicular associated article carrier incorporating a preferred embodiment of a load bearing cross-slat in accordance with the present invention.

Now, and with reference to the drawing, there is depicted therein an article carrier employing a load bearing cross-slat in accordance with the present invention. The article carrier, generally, comprises one or more cross-slats extending transversely across a surface of a vehicle between a pair of tracks 18, 18 provided in the article carrier. The load bearing cross-slat comprises:
(a) a member or slat extending between the tracks; the member cambered to be spaced above the vehicle surface, and
(b) means for anchoring the slat ends to the vehicle surface.

The slat hereof further comprises a rub strip mounted on the cambered member.

At the outset, it should be noted that as used herein and in the appended claims, the term "article carrier" contemplates a luggage rack, ski rack or similar type of vehicle-related or associated device. As is known to the skilled artisan, such devices, ordinarily, comtemplate a plurality of spaced apart slats which support a load or article carried or disposed thereon. Such devices, also, may adopt and incorporate side rails, and stationary and/or movable cross-straps where appropriate. If required, stanchions are utilized to support the side rails and stationary cross straps. The article carriers are, usually, mounted to either the vehicle roof or trunk lid or deck. In the practice thereof, it is to be understood that the present invention is applicable to all such article carriers so long as the carrier, per se, incorporates the load bearing cross-slat as is detailed subsequently.

Figure 2:
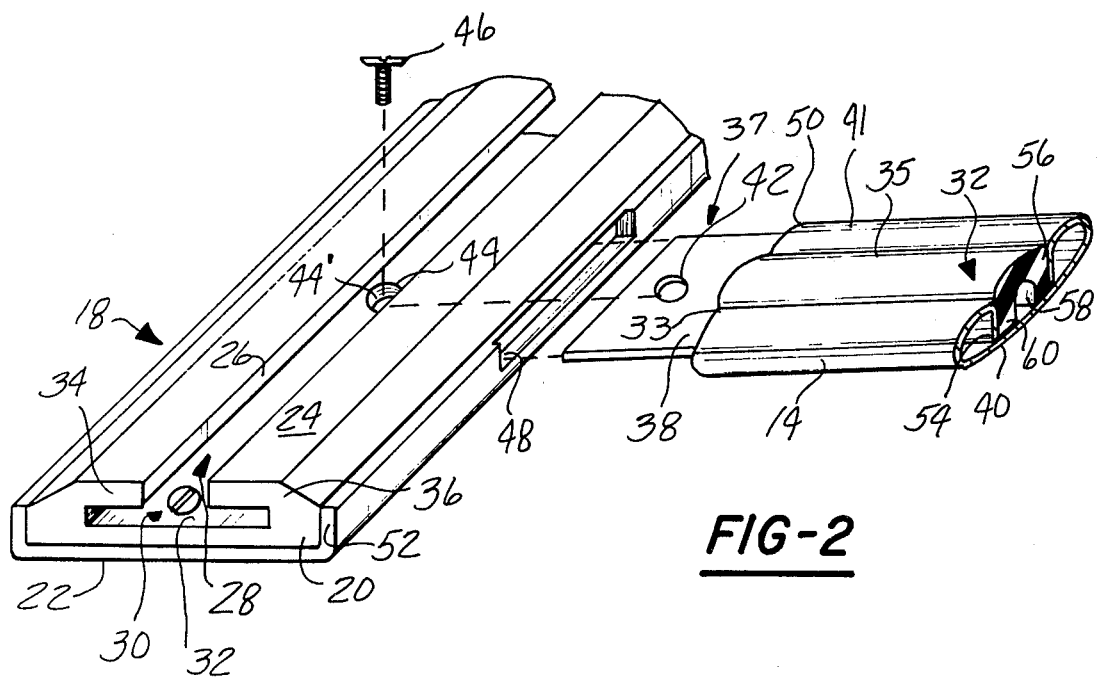
FIG. 2 is a broken exploded view of the load bearing cross-slat of the present invention taken along the line 2—2 of FIG. 1.

Referring again to the drawing and in particular to FIGS. 1 and 2, there is depicted therein a preferred embodiment of the present invention. In accordance herewith, there is provided a vehicle body section 10 having an article carrier 12 disposed and affixed thereon. The article carrier depicted in the drawing comprises a plurality of spaced apart, parallel cross-slats 14. The cross-slats 14 are transversely extending members which are gently or slightly cambered along their length and spaced about the vehicle body. The cross-slats are attached at their ends to the track 18 which are mounted to the vehicle body by any suitable mode, such as threaded fasteners, as shown in FIG. 2.

As defined by the present invention, the article carrier 12 comprises at least one cross-slat 14 adapted to support a load emplaced thereon. The pair of longitudinal, spaced apart, parallel tracks 18 are, optionally, adapted to receive a longitudinally positionable article tie down bracket or cross-rail receiving bracket 16.

Each of the tracks 18 have a surface 20 which is designed to be contiguous with the vehicle body when affixed thereto. An upper surface 24 of the track 18 is provided with a bracket receiving means. The bracket receiving means, generally, comprises a channel 26 formed in the track 18. The channel 26, in a preferred embodiment, includes a longitudinal slot 28 formed substantially along the extent of the upper surface and is formed downwardly therefrom. The slot 28 is in registry with and opens up into an enlarged guidepath 30. The guidepath is coextensive with the slot 28. The guidepath 30 includes a bottom wall 32 which defines a seat for locking the bracket 16 in place.

A resilient pad 22 is interposed the slat 12 and the vehicle surface to prevent galvanic corrosion as well as scratching or marring of the surface. The pad has a plurality of openings 48 between the pad and the track along the length thereof to accommodate a mounting means 36 which will be described more fully hereinbelow. The pad 22 has a plurality of apertures 44' to receive the fasteners therethrough. A plurality of openings or apertures 44' are formed in the bottom wall 32 of the track to register with apertures 44'. The apertures receive threaded fasteners 46 or the like therethrough for securing the track to the vehicle surface. As noted the track 18 may, optionally, mount and receive a bracket 16 therein. The bracket 16, where used, is preferably, selectively positionable along the track and releasably locked in place by a pair of opposed inwardly directed shoulders 34, 36.

The load bearing cross-slat 14, can comprise a rolled sheet metal member, molded plastic, a solid or hollow interior extrusion or the like, as desired having a bottom wall 40 and an upper surface 41. A pair of opposed sidewalls 53 interconnect the upper and lower surfaces to define a unitary member. A channel 33 is formed in the surface 41 for receiving a removable load bearing rub strip 35. As noted, the slat 14, comprises means 37 for mounting the ends of the slat of the vehicle surface, and disposed at each end of the slat 14.

Each means 37 comprises a tongue 38 which is an extension of the bottom wall 40 of the cross-slat 14. An aperture 42 formed in the tongue aligns with the apertures 44' and 44 in the bottom wall 32 of the track 18. A threaded fastener 46 passes through the apertures 42, 44' and 44 to engage an aperture (not shown) in the vehicle surface to secure the cross strap 14 to the track 18 and mounting pad, as well as to the vehicle surface.

As shown in the drawing, a portion of the pad 22 is cut away from the area where the tongue 38 abuts the bottom wall 20, to form the opening 48. The tongue 38 is, thus, sandwiched between the bottom wall 20 and the pad 22. When the aperture 42 is aligned with the aperture 44, an end 50 of the cross slat 14 abuts a side wall 52 of the track 18.

The camber of the cross slat produces a downward and outward force on the end 50 of the cross slat when a load has been placed upon the cross slat 14. The fastener 46 and the wall 52 together with the tongue 38 and the end wall 50 cooperate to support the downward and outward forces exerted by the slat 14 when a load has been placed thereon. By supporting the cross slat end 50 between an opposed pair of tracks 18 a slender streamlined slat 14 may be employed to support the load. By providing end support for the slat 14 at the track 18 deflection of the slat 14 is prevented due to the camber of the slat and its support at the ends thereof.

As shown in the drawing (FIG. 2) the cross-slat 14 has a generally streamlined cross section to minimize wind resistance and drag when the vehicle is underway. The channel 33 is formed in the center of the cross slat 14 along its length. The channel 33 is defined by a pair of opposed downward and outwardly sloping sides 54 making the bottom of the channel 33 wider than the top. The rub strip 35 is configured to be insertable into the channel 33 and snugly retained therein.

The rub strip 35 has an arcuate upper surface projecting above the cross strap to provide a surface to rest articles upon. The rub strip 35 is made of a resilient material such as rubber to provide a non-slip, scratch resistant, and non-abrasive surface against which articles to be retained by the carrier can rest. The rub strip 35 has a main body and a pair of spread apart downward projecting legs 56 which cooperate to define a recess 58 therebetween. The legs 56 project downward and outward and rest on the bottom wall 40 of the slat. A bottom portion 60 of the legs 56 rests on the bottom wall 40 to render the rub strip 35 capable of supporting a load without collapsing into the channel. The outward spacing across the legs exceeds the dimension created by the outward sloping sides 54 of the channel 35. The resiliency of the rub strip material allows the legs 56 to be squeezed together partially filling the recess 58 and allowing the rub strip 35 to be easily inserted into the channel 33. The outward sloping sides 54 and the outward sloping legs 56 cooperate to hold the rub strip 35 in the channel 33 in a removable manner. If the rub strip should be scuffed, cut, or otherwise damaged it can be readily removed and replaced without removing the cross slat. Heretofore rub strips were mounted to slats and rails with lock seam arrangements. The cooperation between the legs 56 and the sides 54 obviates the need for the lock seam. In the previously used configuration, the rub strip was only insertable and removable from the end of the cross-slat. This requires removing the cross-slat from engagement with the track to remove or install the rub strip.

The preferred bracket includes a positioning means which comprises a slide plate or base adapted to be slidingly disposed in the channel 26 formed in the track 18. A locking means is provided to releasably lock the bracket along the track. The locking means, generally, includes a key threadably secured to a ratcheted disc and which extends through the positioning means. The disc is manually rotatable by grasping projections of the disc which project from the bracket. As the disc is rotated in a first direction, the key is urged into engagement with a wall of the track to lock the bracket in position. Rotating the disc in a second direction disengages the key from the track to permit movement of the bracket along the track. The bracket and ratcheted disc is more fully disclosed in copening U.S. patent application Ser. No. 015,327 filed Feb. 26, 1979 entitled "Tie-Down Bracket With Ratcheted Disc." Other useful brackets are found in the art, also, such as in U.S. Pat. No. 4,132,335.

There has been described hereinabove a load bearing cross slat adapted to extend transversely across a vehicle roof between a pair of carrier tracks. The cross slat is gently cambered to be spaced above the vehicle roof and anchored to the tracks at the slat ends.

Having thus described the invention, what is claimed is:

1. A load bearing assembly for an automotive vehicle mounted carrier of the type including a pair of spaced track members fixed to a vehicle surface and at least one cross-slat supported between said track members, the improvement wherein
   (a) each track member includes
      (1) a base portion adapted to be supported upon said vehicle surface,
      (2) inner and outer end walls projecting upwardly from said base portion,
      (3) upper wall portions projecting inwardly from said end walls and vertically spaced above said base portion, the inner ends of said upper wall portions being transversely spaced whereby the base portion, the end walls and said upper walls define an inverted T-type slot extending longitudinally of each track member,
      (4) a transverse opening formed through each inner end wall;
   (b) said cross-slat including tongue-like elements formed at each end thereof, said tongue-like elements respectively projecting through said inner wall openings and extending transversely of said track slot; and
   (c) common means for non-movably fastening said each tongue-like element and its associated track member to said vehicle surface.

2. A load bearing assembly as set forth in claim 1 wherein said cross-slat is cambered upwardly so as to be spaced from said vehicle surface between said tracks.

3. A load bearing assembly as set forth in claim 2 wherein the outer ends of said cross-slat are partially cut away to provide said tongue-like elements and vertical wall sections at the innermost ends of said elements, said wall sections being adapted to abut against the inner end walls of said track members to maintain said cross-slat camber when a load is placed upon the cross slat.

4. A load bearing assembly as set forth in claim 1 wherein the outer ends of said cross-slat are partially cut away to provide said tongue-like elements.

* * * * *